United States Patent [19]

Takaya et al.

[11] Patent Number: 5,294,661

[45] Date of Patent: Mar. 15, 1994

[54] WEATHER-RESISTANT POLYOXYMETHYLENE COMPOSITION AND MOLDED ARTICLE THEREOF

[75] Inventors: Katsuhiko Takaya; Shuichiro Kono, both of Kurashiki, Japan

[73] Assignee: Asahi Kasei Kogyo Kabushiki Kaisha, Osaka, Japan

[21] Appl. No.: 987,076

[22] Filed: Dec. 7, 1992

Related U.S. Application Data

[63] Continuation of Ser. No. 728,382, Jul. 11, 1991, abandoned, which is a continuation of Ser. No. 622,274, Dec. 6, 1990, abandoned, which is a continuation of Ser. No. 218,899, Jul. 14, 1988, abandoned.

[30] Foreign Application Priority Data

Jul. 15, 1987 [JP] Japan .................. 62-174897

[51] Int. Cl.$^5$ ............................. C08L 51/00
[52] U.S. Cl. .................. 524/504; 524/505; 524/512; 525/154; 525/64; 525/92
[58] Field of Search .......... 524/512, 505, 504; 525/154, 64, 92

[56] References Cited

U.S. PATENT DOCUMENTS

4,814,397  3/1989  Novak ................. 525/154

FOREIGN PATENT DOCUMENTS

0115373  8/1984  European Pat. Off. .
0192356  8/1986  European Pat. Off. .
1931392  1/1971  Fed. Rep. of Germany .
1026017  4/1966  United Kingdom .

OTHER PUBLICATIONS

Chemical Abstracts, vol. 86, part 16, Apr. 18, 1977, p. 64, No. 107894x, L. P. Gritsenko et al.: "Effect of dyes on the thermal and oxidative thermal degradation of polyformaldehyde".
Chemical Abstracts, vol. 85, part 8, Aug. 23, 1976, p, 41, No. 47617b.

*Primary Examiner*—John C. Bleutge
*Assistant Examiner*—Karen A. Dean
*Attorney, Agent, or Firm*—Birch, Stewart, Kolasch & Birch

[57] ABSTRACT

A polyoxymethylene composition useful for producing weather-resistant molded articles comprising 60–95% by weight of a polyoxymethylene, a methacrylic acid ester polymer, and a pigment, a dye or a mixture thereof. The weather-resistant molded articles obtained therefrom.

12 Claims, 1 Drawing Sheet

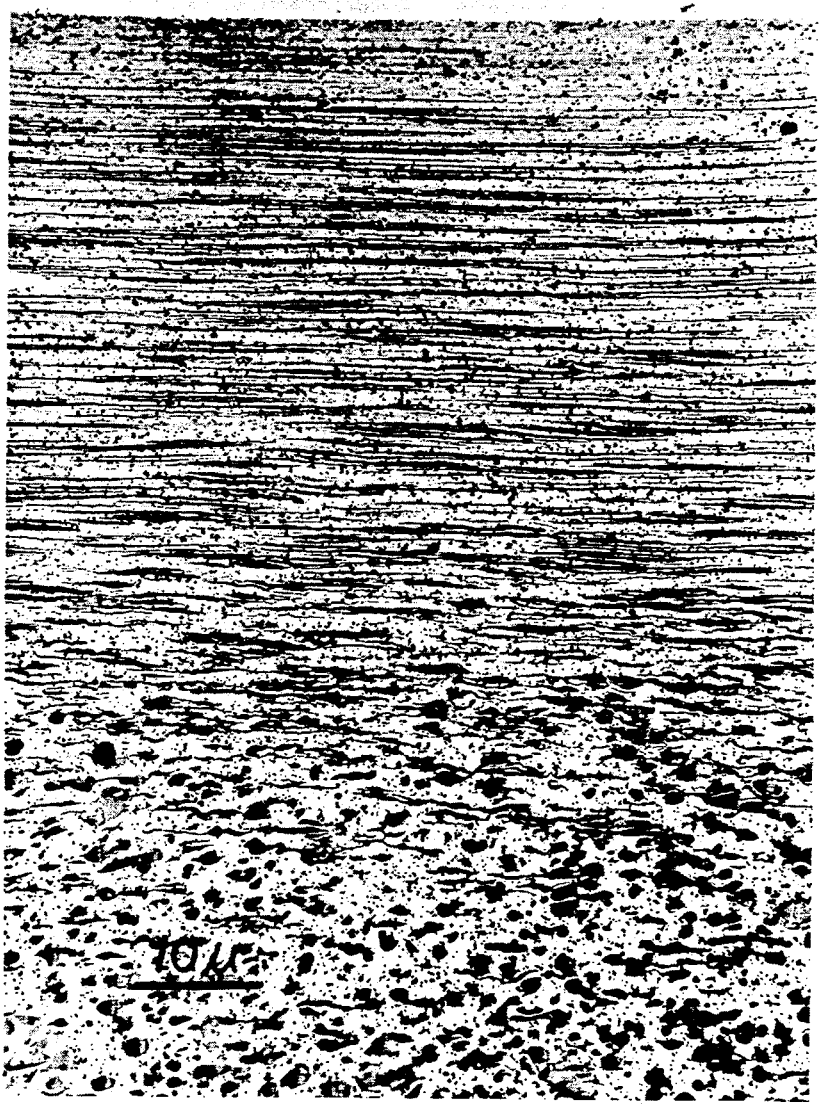

WEATHER-RESISTANT POLYOXYMETHYLENE COMPOSITION AND MOLDED ARTICLE THEREOF

This application is a continuation of application Ser. No. 07/728,382 filed on Jul. 11, 1991, now abandoned, which is a continuation of application Ser. No. 07/622,274 filed Dec. 6, 1990, now abandoned, which is a continuation of application Ser. No. 07/218,899 filed Jul. 14, 1988, now abandoned.

BACKGROUND OF THE INVENTION

1. Field of the Invention

The present invention relates to a polyoxymethylene composition which is useful for producing molded articles having excellent weather resistance, and to a molded articles thereof. More particularly, the present invention relates to polyoxymethylene composition which, when molded, can be used as an exterior part without requiring the surface of the molded article to be plated or coated due to the weather-resistant characterization of the article and to a molded article obtained from the composition.

2. Discussion of Related Art

Polyoxymethylene is superior in mechanical strength, friction resistance, wear resistance, fatigue resistance, moldability, etc. and is in wide use in such fields as electronics, electricity, automobiles and precision machines.

Molded articles of polyoxymethylene exhibit poor weather resistance properties when used as a molded article for exterior parts (e.g. outside door handle of automobile). Molded articles of polyoxymethylene in general has insufficient resistance to weather conditions. Therefore, when a polyoxymethylene molded article is exposed to sunlight for a long period of time, the polyoxymethylene undergoes molecular fission due to the light energy at the surface of the molded article, and as a result, whitening and cracking takes place and the appearance of the molded article becomes substantially impaired. When these phenomena occur and are severe, the molded article will possess reduced mechanical strength.

In order to reduce these problems, there have been proposed, for example, a method wherein an ultraviolet absorber (e.g. benzophenone type ultraviolet absorber, benzotriazole type ultraviolet absorber and the like) is added to a polyoxymethylene molded article and a method wherein the above ultraviolet absorber and a hindered amine type light stabilizer are added in combination to a polyoxymethylene molded article.

However, the former methods of adding, an ultraviolet absorber or a mixture thereof with a hindered amine type light stabilizer, to a polyoxymethylene molded article, requires the addition of these additives in large amounts in order to obtain sufficient weather resistance. In these cases, deterioration would occur, for example, the heat stability, appearance and mechanical strength properties of the article, whereby the characteristics for the polyoxymethylene are impaired.

A method is presently in use in which a protective layer such as a plating layer, a coating layer or the like, is formed on the surface of a polyoxymethylene molded article to protect the surface.

However, even though a method of forming a protective layer (e.g. a plating layer, a coating layer) on the surface of a polyoxymethylene molded article is free from the above-mentioned problems, there is still the drawback of an increase in process steps, which in turn would increase production costs.

SUMMARY OF THE INVENTION

It is an object of the present invention to provide a polyoxymethylene composition which is useful for producing a molded article having excellent weather resistance in which, said molded article, can be used as an exterior part without requirement of plating or coating on the surface of the molded article. This pertains as well to a colored molded article obtained from the composition.

The present inventors found that by adding a methacrylic acid ester polymer and a pigment, a dye or a mixture thereof in given proportions to polyoxymethylene, the characteristics of polyoxymethylene are retained and its the weather resistance of a molded article formed therefrom is improved, and the thus treated polyoxymethylene could be advantageously used as a colored exterior part. This finding has led to the present invention. The polyoxymethylene composition of the present invention which is useful for producing weather-resistant molded articles is obtained by adding 0.5–4% by weight of a pigment, dye or a mixture thereof to a composition comprising 60–95% by weight of a polyoxymethylene and 5–40% by weight of a methacrylic acid ester polymer.

The weather-resistant polyoxymethylene molded article of the present invention is obtained by molding the above polyoxymethylene composition and has a structure such that the particles of the methacrylic acid ester polymer are finely dispersed in the matrix of the polyoxymethylene and that the shape of these particles gradually change into lamellas as their position approaches the surface of the molded article.

Conventionally, the blending of polyoxymethylenes with acrylic acid ester polymers is generally not conducted because of their poor compatibility with one another. However, attempts have been made to obtain a molded article of pearl luster from those blends by utilizing their poor compatibility. [See, for example, Japanese Patent Publication No. 51-39746 and Japanese Patent Application Kokai (Laid-Open) No. 49-45958.]

The molded articles obtained from these blends have poor weather resistance.

BRIEF DESCRIPTION OF DRAWING

FIG. 1 shows an electron micrograph of a test piece according to the present invention.

DETAILED DESCRIPTION OF PREFERRED EMBODIMENT

The polyoxymethylene used in the composition of the present invention can be an oxymethylene homopolymer or an oxymethylene copolymer. The oxymethylene homopolymer is an example of a polyacetal obtained by polymerizing formaldehyde.

The oxymethylene copolymer used in the present composition is a copolymer having a structure which is, for example, a random linkage of an oxymethylene unit represented by the general formula (I)

wherein n is an integer of 1 to 5,000 or above and an oxyalkylene unit represented by the general formula (II)

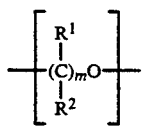
(II)

wherein $R^1$ and $R^2$ which may be the same or different are each a hydrogen atom or an alkyl, allyl or aryl group, and m is an integer of 2-6. The proportion of the oxyalkylene unit is preferably 0.05-50 moles, more preferably 0.1-20 moles per 100 moles of the oxymethylene unit. As the oxyalkylene unit, there can be mentioned, for example, an oxyethylene unit, an oxypropylene unit, an oxytetramethylene unit and an oxyphenylene unit. Of these oxyalkylene units, the oxyethylene unit

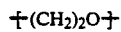

and the oxytetramethylene unit

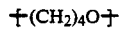

are particularly preferred because the oxymethylene copolymers containing these units can be characterized with better properties.

The oxymethylene copolymer can be obtained by copolymerizing or reacting formaldehyde, trioxane or an oxymethylene homopolymer with a cyclic ether or cyclic formal. It is desirable that the oxymethylene copolymer obtained be subjected to a treatment for stabilization of the molecule terminals. In this stabilization treatment, there is ordinarily used a method in which the —OH group at the copolymer terminals is esterified, or a method in which the copolymer is hydrolyzed to convert the terminals to relatively stable carbon-to-carbon linkages.

The polyoxymethylene ordinarily has a weight-average molecular weight of 20,000 to 75,000, and preferably 20,000-65,000.

The polyoxymethylene content in the composition is 60-95% by weight, preferably 60-85% by weight.

As the methacrylic acid ester polymer in the present composition, there can be used a homopolymer or copolymer of a methacrylic acid ester.

As the homopolymer of a methacrylic acid ester, there is preferred a homopolymer of a $C_{1-6}$ alkyl methacrylate, and particularly preferred is methyl methacrylate.

As the copolymer of a methacrylic acid ester, there can be used a random, block or graft copolymer of a methacrylic acid ester.

As the random copolymer, there can be mentioned a random copolymer of two different $C_{1-6}$ alkyl methacrylates and a random copolymer of a $C_{1-6}$ alkyl methacrylate and an acrylic acid ester (the alcohol component of the ester is preferably a $C_{1-6}$ alkyl alcohol). Particularly preferred are a copolymer of methyl methacrylate and a $C_{2-6}$ alkyl methacrylate and a random copolymer of methyl methacrylate and a $C_{1-6}$ alkyl acrylate. There can also be used a random-block copolymer obtained by adding to a random copolymer illustrated in the above a block copolymer as one of the components.

As the block copolymer, there can be mentioned a block copolymer of two different $C_{1-6}$ alkyl methacrylates and a block copolymer of a $C_{1-6}$ alkyl methacrylate and an acrylic acid ester (the alcohol component of the ester is preferably a $C_{1-6}$ alkyl alcohol). Particularly preferred are a block copolymer of methyl methacrylate and a $C_{1-6}$ alkyl methacrylate and a block copolymer of methyl methacrylate and a $C_{1-6}$ alkyl acrylate.

As the graft copolymer, there can be mentioned graft copolymers obtained by graft-polymerizing onto a homopolymer of a $C_{1-6}$ alkyl methacrylate or a random copolymer as mentioned above, a $C_{1-6}$ alkyl methacrylate or an acrylic acid ester (the alcohol component of the ester is preferably a $C_{1-6}$ alkyl alcohol). Particularly preferred are graft copolymers obtained by graft-polymerizing a $C_{1-6}$ alkyl methacrylate or acrylate to the main chain of a random or block copolymer of methyl methacrylate and a $C_{2-6}$ alkyl methacrylate or of a random or block copolymer of methyl methacrylate and a $C_{1-6}$ alkyl acrylate.

When the polymethacrylic acid ester is a copolymer containing an acrylic acid ester component, it is preferred that the proportion of the acrylic acid ester component be 20% or less, particularly 15% by weight or less based on the copolymer and the proportion of the methacrylic acid ester (the alcohol component of the ester is preferably a $C_{1-6}$ alkyl alcohol) be 80% by weight or more, particularly 85% by weight or more. Particularly preferred is a copolymer containing a methyl methacrylate component in an amount of 80% by weight or more, particularly 85% by weight or more.

When the methacrylic acid ester polymer is a copolymer, the copolymer is preferably a random copolymer.

The methacrylic acid ester polymer used in the composition of the present invention has a number-average molecular weight of 60,000-1,500,000, preferably 60,000-800,000. The content of the methacrylic acid ester polymer in the composition is 15-40% by weight.

In the present composition, a pigment, a dye or a mixture thereof is added to the above-mentioned composition comprising a polyoxymethylene and a methacrylic acid ester polymer, and the resulting polyoxymethylene composition can be used in colored exterior parts requiring no plating layer on the surface.

As the color for coloring, a black color most typically is used. For the black color, carbon black is preferably used as a pigment. Carbon black used in the composition has an additional effect of further improving the weather resistance of the molded article produced from the composition.

As the carbon black, there can be used those ordinarily employed in this field, such as Micronex, Vulcan, Phiblack, Sterling, Carbolac, Monarch, Kosmink, Ukcarb, Kosmos, Shawainigan, P33, Seval, Regal, acetylene black and Ketjen black. The amount of carbon black added is 0.5-4% by weight, preferably 1 to 3.5% by weight based on the total weight of the polyoxymethylene and the polymethacrylic acid ester.

As other pigments, there can be mentioned, for example, those of azo type, phthalocyanine type, perylene type, quinacridone type, anthraquinone type, indoline type, titanium compound type, iron oxide type and cobalt compound type.

As the dye, there can be used, for example, anthraquinone type dyes.

The pigment and the dye can be used together. The use of a pigment or the combination use of a pigment and a dye is preferred in the present invention. The use of carbon black is particularly preferred.

The composition of the present invention can further comprise an ultraviolet absorber.

As the ultraviolet absorber, there can be used a benzotriazole type ultraviolet absorber, a benzophenone type ultraviolet absorber, an aromatic benzoate type ultraviolet absorber, a cyanoacrylate type ultraviolet absorber, an oxalic anilide type ultraviolet absorber, etc. Of these, the benzotriazole type ultraviolet absorber is preferable.

The ultraviolet absorber can be used in the composition in an amount of 0.1–2% by weight, preferably 0.15–1.8% by weight based on the total amount of the polyoxymethylene and the methacrylic acid ester polymer.

Examples of the ultraviolet absorber usable in the present invention are 2-(2'-hydroxy-5'-methyl-phenyl)-benzotriazole, 2-(2'-hydroxy-3',5'-di-t-butyl-phenyl)-benzotriazole, 2-(2'-hydroxy-3',5'-di-isoamylphenyl)-benzotriazole, 2-(2'-hydroxy-3',5'-bis($\alpha,\alpha$-dimethylbenzyl)-phenyl)benzotriazole, 2-(2'-hydroxy-4'-octoxyphenyl)-benzotriazole, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-hydroxy-4-oxybenzylbenzophenone, p-t-butylphenyl salicylate, p-octylphenyl salicylate, 2-ethylhexyl 2-cyano-3,3'-diphenylacrylate, ethyl 2-cyano-3,3'-diphenylacrylate, N-(2-ethylphenyl)-N'-(2-ethoxy-5-t-bytylphenyl)oxalic diamide, and N-(2-ethylphenyl)-N'-(2-ethoxyphenyl)oxalic diamide.

The composition of the present invention can furthermore comprise a light stabilizer, for example, a hindered amine type light stabilizer.

As the hindered amine type light stabilizer, there can be used those commercially available and ordinarily employed in this field, such as described in Japanese Patent Application Kokai (Laid-Open) No. 60-195155.

Examples of the hindered amine type light stabilizer usable in the present invention are 4-acetoxy- 2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4-piperidyl)-malonate, bis(2,2,6,6-tetramethyl-4-piperidyl)adipate, bis(2,2,6,6-tetramethyl-4-piperidyl)sebacate, bis(1,2,2,6,6-pentamethylpiperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl)hexamethylene-1,6-dicarbamate, bis(1-methyl-2,2,6,6-tetramethyl-4-piperidyl)-adipate and tris(2,2,6,6-tetramethyl-4-piperidyl)benzene-1,3,5-tricarboxylate.

The amount of the above light stabilizer used in the composition of the present invention is 0.1–2% by weight, preferably 0.15–1.8% by weight based on the total weight of the polyoxymethylene and the methacrylic acid ester polymer.

The combined use of the ultraviolet absorber and the light stabilizer is preferable because it can further improve the weather resistance of molded article formed from the composition of the present invention. In this case, the proportions of the ultraviolet absorber and the light stabilizer are 100 parts by weight and 20–200 parts by weight, respectively.

In order to have properties required for intended applications or purposes, the present composition can furthermore comprise other known additives such as lubricant, nucleating agent, release agent, antistatic agent, surfactant, heat stabilizer such as a polyamide, inorganic filler and the like in such amounts that the effects of the present invention are not impaired.

The composition of the present invention can be produced by premixing raw materials and then kneading the premix in a kneader such as single-screw or twin-screw extruder, Banbury mixer, rolls or the like, or by directly charging each raw material into the kneader to conduct kneading therein. In premixing, there can be used a mixer such as Henschell mixer, cone blender or the like.

The present composition can be made into a molded article according to an ordinary molding method such as injection molding, extrusion molding, blow molding or the like.

The use of the polyoxymethylene composition of the present invention enables the production of a polyoxymethylene molded article having such a structure that the particles of the methacrylic acid ester polymer are finely dispersed in the matrix of the polyoxymethylene and that the shape of these particles gradually changes into lamellas as their position approaches the surface of the molded article. (The structure is shown in an electron micrograph of the cross section of the molded article according to Example 1 which is described later.)

In such a molded article, the surface portion is protected by the lamellas of the methacrylic acid ester polymer. Therefore, the molded article possess remarkably improved weather resistance. It is particularly preferable that the surface portion and the adjacent layer portion of the molded article contain the lamellas of the methacrylic acid ester polymer in such a dense state that substantially no gap is found between the lamellas when viewed from above the surface of the molded article.

In the center of the molded article, the methacrylic acid ester polymer can take a form of dispersed particles because the center portion does not affect the weather resistance of the molded article. This form of dispersed particles in the center portion is preferable because it can prevent the reduction of the molded article in mechanical properties such as elastic modulus in bending.

The molded article having the above-mentioned structure can be produced by using the polyoxymethylene composition of the present invention and advantageously utilizing the shear effect of the resin during flow in molding. That is, in molding (e.g. injection molding, extrusion molding), the shear rate of the resin through the die is maintained at a given value or above.

The shear rate of resin is preferably 40 sec$^{-1}$ or above, more preferably $10^2$–$10^5$ sec$^{-1}$. The shear rate of resin varies depending upon the melt viscosity of resin, the injection pressure, the ratio of length to width (L/T) of die, etc. Therefore, once the resin to be molded has been decided, the optimum values for the above items are determined by experiment, whereby a necessary shear rate for the resin can be set.

EXAMPLES

The present invention is described in more detail by way of Examples.

The components shown in Table 1 are mixed in amounts also shown in Table 1. The resulting mixture is melt-kneaded using an extruder and then injection-molded. As the extruder, there is used Model 100E (5.3 oz) manufactured by Toshiba Machine Co., Ltd. The resin pressure is 558-1,673 kg/cm$^2$ G and the injection rate is 19.9-131.6 cm/sec.

In the injection molding, a die for test piece preparation is used to mold a test piece of 12.7 mm in width, 127 mm in length and 3 mm in thickness. During molding, the shear rate through the die is controlled at $10^3$ to $7 \times 10^3$ sec$^{-1}$.

The molded test piece is measured for weather resistance and mechanical properties. The results are shown in Table 1. The data for each Example and each Comparative Example are each an average value when 10 same test pieces for one sample (one resin composition) have been molded and measured.

In Table 1, the copolymer A as a polyacetal is a random copolymer consisting of 98 mole % of a trioxane component and 2 mole % of an ethylene oxide component. Its melt index (M.I.) is 2.6 g/10 min. The copolymer B as a polyacetal is same as the copolymer A except that it has an M.I. of 9.3 g/10 min. The homopolymer as a polyacetal has an M.I. of 18.7 g/10 min. The polycarbonate composition of Comparative Example 3 is a weather-resistant grade for automotive exterior part which is commercially available.

The roughly center portion [in the width direction (the direction orthogonal to the flow direction of resin] of the molded test piece of Example 1 is cut out, and an electron micrograph is taken for the side of the resin flow direction of the cut-out portion. The micrograph is shown in FIG. 1. JEM100SX manufactured by Nihon Denshi K. K. is used as the electron microscope.

In Table 1, the weather resistance and mechanical properties are measured according to the following methods.

(1) Time to cracking appearance

A test piece is irradiated with an ultraviolet light in an atmosphere of 83° C., using an ultraviolet irradiation tester (Eye Super UV Tester, Model SUV-F1 manufactured by IWASAKI ELECTRIC CO., LTD., ultraviolet irradiation density: 100 mW/cm$^2$), and the time to cracking appearance is accumulated. Visual recognition of clear cracking appearance is taken as cracking appearance.

(2) Gloss

Gloss of the test piece after 100 hours of ultraviolet irradiation is measured in accordance with JIS Z 8741 (incident angle: 60°).

(3) Flexural modulus

Measured in accordance with ASTM D 790.

TABLE 1

| | Composition | | | | | Additives | |
|---|---|---|---|---|---|---|---|
| | Polyacetal (wt. %) | Polymethacrylic acid ester (wt. %) | Other polymer (wt. %) | Carbon black (wt. %) | Dye or pigment (wt. %) | Ultraviolet agent (wt. %) | Hindered amine (wt. %) |
| Example 1 | Copolymer A 72 | Polymethyl methacrylate 28 | — | Acetylene black 2.9 | — | Tinuvin 234 0.5 | Sanol LS 770 0.3 |
| Example 2 | Copolymer A 65 | X$_1$ 35 | — | Ketjen black 2.9 | — | — | — |
| Example 3 | Copolymer A 65 | Polymethyl methacrylate 35 | — | Regal 2.9 | — | Tinuvin 234 0.5 | Sanol LS 770 0.5 |
| Example 4 | Copolymer A 62 | Polymethyl methacrylate 38 | — | — | Red pigment*[1] 0.3 | Tinuvin P 0.35 Tinuvin 234 0.35 | Sanol LS 770 0.4 |
| Comparative Example 1 | Copolymer A 100 | — | — | — | — | — | — |
| Comparative Example 2 | Copolymer A 100 | — | — | Ketjen black 2.9 | — | Tinuvin 234 0.7 | Sanol LS 770 0.5 |
| Comparative Example 3 | — | — | Polycarbonate 100 | Acetylene black 2.9 | — | Tinuvin 234 0.5 | Sanol LS 770 0.3 |
| Comparative Example 4 | Copolymer 70 | Polybutyl methacrylate 30 | — | Regal 2.5 | — | Tinuvin 234 0.7 | Sanol LS 770 0.45 |
| Comparative Example 4 | Copolymer 60 | Polybutyl methacrylate 20 Polymethyl methacrylate 20 | — | Acetylene black 2.8 | — | Tinuvin 234 0.7 | Sanol LS 770 0.40 |
| Example 5 | Copolymer 60 | X$_2$ 40 | — | Ketjen black 2.7 | — | Tinuvin 234 0.6 | Sanol LS 770 0.35 |
| Example 6 | Copolymer 83 | Polymethyl methacrylate 17 | — | Acetylene black 2.9 | — | Tinuvin 234 0.7 | Sanol LS 770 0.5 |
| Example 7 | Homopolymer 70 | Polymethyl methacrylate 30 | — | Regal 2.2 | — | Tinuvin 234 0.6 | Sanol LS 770 0.25 |
| Comparative Example 6 | Copolymer 60 | Polymethyl methacrylate 10 | Polycarbonate (Panlite L1225) 30 | Acetylene black 2.9 | — | Tinuvin 234 0.5 | Sanol LS 770 0.3 |
| Example 8 | Copolymer A | X$_3$ | — | Acetylene | | Tinuvin 235 | Sanol LS 770 |

TABLE 1-continued

| | | | | | | | |
|---|---|---|---|---|---|---|---|
| | 65 | 35 | — | black 2.9 | — | 0.7 | 0.3 |
| Example 9 | Copolymer A 65 | $X_4$ 35 | — | Acetylene black 2.9 | — | Tinuvin 235 0.7 | Sanol LS 770 0.3 |
| Example 10 | Copolymer B 60 | $X_5$ 40 | — | Acetylene black 2.8 | — | Tinuvin 235 0.7 | Sanol LS 770 0.3 |
| Example 11 | Copolymer B 62 | $X_6$ 38 | — | Acetylene black 2.8 | — | Tinuvin 235 0.7 | Sanol LS 770 0.3 |

| | Weather resistance Time to cracking (hr) | Gloss (%) | Mechanical Properties Flexural modulus (Kg/cm$^2$) |
|---|---|---|---|
| Example 1 | >200 | 75 | 28,000 |
| Example 2 | >200 | 69 | 30,500 |
| Example 3 | >200 | 78 | 30,400 |
| Example 4 | 180 | 63 | 30,100 |
| Comparative Example 1 | 25 | 7 | 23,300 |
| Comparative Example 2 | 50 | 25 | 23,000 |
| Comparative Example 3 | >200 | 18 | 23,800 |
| Comparative Example 4 | >200 | 77 | 23,800 |
| Comparative Example 4 | >200 | 80 | 24,700 |
| Example 5 | >200 | 66 | 24,900 |
| Example 6 | 200 | 60 | 23,400 |
| Example 7 | 130 | 60 | 31,200 |
| Comparative Example 6 | >200 | 22 | 23,000 |
| Example 8 | >200 | 76 | 22,600 |
| Example 9 | >200 | 79 | 22,700 |
| Example 10 | >200 | 68 | 21,400 |
| Example 11 | >200 | 67 | 21,300 |

*[1]PVFAFT RED E3B, quinacridone type $X_1$: A random copolymer of methyl methacrylate and methyl acrylate (methyl acrylate content: 3.5% by weight)
$X_2$: A random copolymer of methyl methacrylate and butyl methacrylate (butyl methacrylate content: 4% by weight)
$X_3$: A graft copolymer obtained by graft-polymerizing butyl methacrylate onto a polymethyl methacrylate (butyl methacrylate content: 3.5% by weight)
$X_4$: A graft copolymer obtained by graft-polymerizing butyl methacrylate onto a random copolymer of methyl methacrylate and methyl acrylate (methyl acrylate content: 3.5% by weight, butyl methacrylate content: 3% by weight)
$X_5$: A block copolymer of methyl methacrylate and butyl methacrylate (butyl methacrylate content: 4.8% by weight)
$X_6$: A block copolymer of (a) a random copolymer of methyl methacrylate and methyl acrylate and (b) butyl methacrylate (methyl acrylate content: 3.8% by weight, butyl methacrylate content: 4.4% by weight)

What is claimed:

1. A polyoxymethylene molded article having methacrylic acid ester polymer particles finely dispersed in a polyoxymethylene matrix, wherein the shape of said particles changes gradually into lamellas as the position of said particles approaches the surface of said article, the molded article being obtained by molding a weather-resistant polyoxymethylene composition comprising 60-95% by weight of a polyoxymethylene and 5-40% by weight of a methacrylic acid ester polymer and 0.5-4% by weight of a pigment, a dye or a mixture thereof, through a die at a shear rate of $10^2$-$10^5$ sec$^{-1}$.

2. The article according to claim 1, wherein the amount of the methacrylic acid ester polymer is 15-40% by weight.

3. The article according to claim 1, wherein the methacrylic acid ester polymer is a homopolymer of a $C_{1-6}$ alkyl methacrylate.

4. The article according to claim 3, wherein the methacrylic acid ester polymer is polymethyl methacrylate.

5. The article according to claim 1, wherein the methacrylic acid ester polymer is a random copolymer of methyl methacrylate and a $C_{2-6}$ alkyl methacrylate or a $C_{1-6}$ alkyl acrylate.

6. The article according to claim 1, wherein the methacrylic acid ester polymer is a block copolymer of methyl methacrylate and a $C_{1-6}$ alkyl methacrylate or an alkyl acrylate.

7. The article according to claim 1, wherein the methacrylate ester polymer is a graft copolymer obtained by graft-polymerizing a $C_{1-6}$ alkyl methacrylate or an alkyl acrylate onto a homopolymer of a $C_{1-6}$ alkyl methacrylate or a random copolymer of methyl methacrylate and a $C_{2-6}$ alkyl methacrylate or a $C_{1-6}$ alkyl acrylate.

8. The article according to claim 1, which comprises a hindered amine type light stabilizer as an ultraviolet absorber.

9. The article according to claim 1, which comprises a polyamide as a heat stabilizer.

10. The article according to claim 1, in which the pigment, dye or mixture thereof is a pigment.

11. The article according to claim 10, in which the pigment is carbon black.

12. The article according to claim 1, wherein the shear rate is $10^3$ to $7 \times 10^3$ sec$^{-1}$.

* * * * *